US012189332B2

(12) United States Patent
Sato

(10) Patent No.: US 12,189,332 B2
(45) Date of Patent: Jan. 7, 2025

(54) IMAGE FORMING APPARATUS HAVING A DRAWER

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/444,897

(22) Filed: Feb. 19, 2024

(65) Prior Publication Data

US 2024/0192635 A1 Jun. 13, 2024

Related U.S. Application Data

(63) Continuation of application No. 18/303,721, filed on Apr. 20, 2023, now Pat. No. 11,934,142, which is a (Continued)

(30) Foreign Application Priority Data

Jul. 2, 2019 (JP) ................................ 2019-123950

(51) Int. Cl.
*G03G 21/18* (2006.01)
*G03G 21/16* (2006.01)

(52) U.S. Cl.
CPC ..... *G03G 21/1842* (2013.01); *G03G 21/1623* (2013.01); *G03G 21/1814* (2013.01); *G03G 21/1817* (2013.01); *G03G 2221/1869* (2013.01)

(58) Field of Classification Search
CPC .......... G03G 21/1623; G03G 21/1671; G03G 21/1676; G03G 21/1814; G03G 21/1817; (Continued)

(56) References Cited

U.S. PATENT DOCUMENTS 8,831,478 B2 9/2014 Mushika et al.
10,976,699 B2 4/2021 Sato
(Continued)

FOREIGN PATENT DOCUMENTS

JP 6-43706 A 2/1994
JP 2009-092859 A 4/2009
(Continued)

OTHER PUBLICATIONS

Office Action issued in corresponding Japanese Application No. 2019-123950, Mar. 14, 2023.

*Primary Examiner* — Sophia S Chen
(74) *Attorney, Agent, or Firm* — Merchant & Gould P.C.

(57) ABSTRACT

An image forming apparatus is provided, including a housing; a drum cartridge; a developing cartridge; a drawer movable between an inner position and an outer position; and a lock member provided on the drawer and movable between a lock position at which the lock member locks the drum cartridge to the drawer, and a release position at which a lock between the drum cartridge and the drawer is released. The lock member includes an operation portion for moving the lock member between the lock position and the release position. The developing cartridge includes a cover member that covers at least a portion of the operation portion in a state in which the drum cartridge is mounted to the drawer, and the developing cartridge is mounted to the drum cartridge.

11 Claims, 11 Drawing Sheets

Related U.S. Application Data continuation of application No. 17/650,284, filed on Feb. 8, 2022, now Pat. No. 11,662,685, which is a continuation of application No. 17/195,849, filed on Mar. 9, 2021, now Pat. No. 11,262,692, which is a continuation of application No. 16/907,546, filed on Jun. 22, 2020, now Pat. No. 10,976,699.

(58) Field of Classification Search
CPC ........... G03G 21/1842; G03G 21/1853; G03G 2221/1869
See application file for complete search history.

(56) References Cited

U.S. PATENT DOCUMENTS

| | | | | |
|---|---|---|---|---|
| 2009/0092412 | A1 | 4/2009 | Kei | |
| 2009/0092414 | A1 | 4/2009 | Tomatsu | |
| 2010/0074646 | A1 | 3/2010 | Miyahara | |
| 2010/0080622 | A1 | 4/2010 | Uchida | |
| 2011/0026968 | A1 | 2/2011 | Ishii et al. | |
| 2012/0183319 | A1* | 7/2012 | Sato | G03G 21/1853 399/117 |
| 2013/0156464 | A1 | 6/2013 | Suzuki et al. | |
| 2015/0277363 | A1 | 10/2015 | Okabe et al. | |
| 2017/0261925 | A1 | 9/2017 | Komatsu et al. | |
| 2018/0095419 | A1 | 4/2018 | Matsuno | |
| 2019/0025755 | A1 | 1/2019 | Wakamatsu et al. | |
| 2019/0146405 | A1* | 5/2019 | Itabashi | G03G 21/1842 399/111 |
| 2019/0155190 | A1 | 5/2019 | Itabashi | |
| 2019/0179254 | A1 | 6/2019 | Itabashi | |
| 2019/0302681 | A1 | 10/2019 | Wang et al. | |
| 2021/0096505 | A1 | 4/2021 | Kim | |

FOREIGN PATENT DOCUMENTS

| | | | |
|---|---|---|---|
| JP | 2009-092914 | A | 4/2009 |
| JP | 2010-102303 | A | 5/2010 |
| JP | 2013-127583 | A | 6/2013 |
| JP | 2016-166981 | A | 9/2016 |
| JP | 2018-060008 | A | 4/2018 |
| JP | 2019-023707 | A | 2/2019 |
| JP | 2019-105825 | A | 6/2019 |

* cited by examiner

IMAGE FORMING APPARATUS HAVING A DRAWER

CROSS REFERENCE TO RELATED APPLICATION

This application is a continuation application of U.S. patent application Ser. No. 18/303,721, filed Apr. 20, 2023, which is a continuation application of U.S. patent application Ser. No. 17/650,284, filed Feb. 8, 2022, now U.S. Pat. No. 11,662,685, issued May 30, 2023, which is a continuation application of U.S. patent application Ser. No. 17/195,849, filed Mar. 9, 2021, now U.S. Pat. No. 11,262,692, issued Mar. 1, 2022, which is a continuation application of U.S. patent application Ser. No. 16/907,546, filed Jun. 22, 2020, now U.S. Pat. No. 10,976,699, issued Apr. 13, 2021, and claims priority from Japanese Patent Application No. 2019-123950, which was filed on Jul. 2, 2019, the entireties of which are incorporated herein by reference.

BACKGROUND

The following disclosure relates to an image forming apparatus.

There has been known an electrophotographic image forming apparatus in which a process cartridge including a photoconductive drum and a developing roller is removably mounted to a drawer. The image forming apparatus of this type requires replacement of the process cartridge when the process cartridge becomes empty of toner. However, the photoconductive drum has not reached the end of its useful life at this time, and thus the photoconductive drum is discarded before the end of the useful life, resulting in increase in running costs.

To solve this problem, an image forming apparatus is devised in which the process cartridge is separated into a drum cartridge including the photoconductive drum and a developing cartridge including the developing roller to enable individual replacement of the drum cartridge and the developing cartridge.

In such an image forming apparatus, unfortunately, the drum cartridge is mounted to the drawer, and the developing cartridge is mounted to the drum cartridge, but the drum cartridge moves relative to the drawer in removal of the developing cartridge from the drum cartridge, making it difficult to remove the developing cartridge.

SUMMARY

Accordingly, an aspect of the disclosure relates to an image forming apparatus capable of making a drum cartridge immovable relative to a drawer when a toner cartridge is removed from the drum cartridge mounted to the drawer.

In one aspect of the disclosure, an image forming apparatus includes: a housing; a drum cartridge including a photoconductive drum; a developing cartridge including a developing roller; a drawer movable between an inner position and an outer position, the drum cartridge being located in the housing when the drawer is located at the inner position in a state in which the drum cartridge is mounted to the drawer, at least a portion of the drum cartridge being exposed to an outside of the housing when the drawer is located at the outer position in the state in which the drum cartridge is mounted to the drawer; and a lock member provided on the drawer and movable between a lock position at which the lock member locks the drum cartridge to the drawer in the state in which the drum cartridge is mounted to the drawer, and a release position at which a lock between the drum cartridge and the drawer is released. The lock member includes an operation portion for moving the lock member between the lock position and the release position. The developing cartridge includes a cover member that covers at least a portion of the operation portion in a state in which the drum cartridge is mounted to the drawer, and the developing cartridge is mounted to the drum cartridge.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, there will be described embodiments by reference to the drawings. It is to be understood that the following embodiments are described only by way of example, and the disclosure may be otherwise embodied with various modifications without departing from the scope and spirit of the disclosure.

Overall Configuration of Image Forming Apparatus

Figure 1:
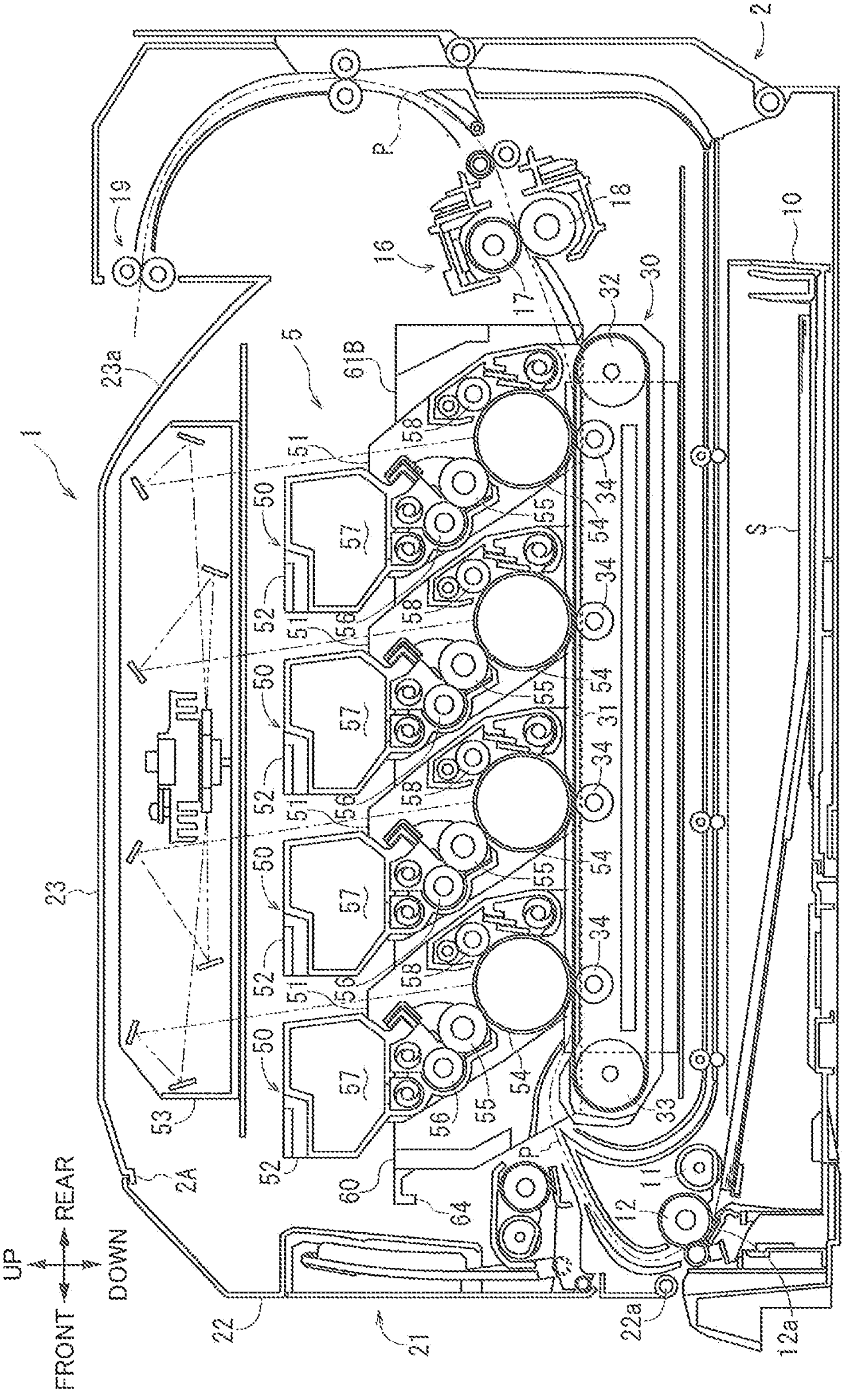
FIG. 1 is a central cross-sectional view of an image forming apparatus.

FIG. 1 illustrates an image forming apparatus 1 according to one embodiment of the present disclosure. The image forming apparatus 1 is an electrophotographic tandem color printer configured to form an image on a sheet S in multiple colors.

In the following description, the left side in FIG. 1 is defined as a front side of the image forming apparatus 1, the right side in FIG. 1 as a rear side of the image forming apparatus 1, the front side of the sheet of FIG. 1 as a right side of the image forming apparatus 1, and the back side of the sheet of FIG. 1 as a left side of the image forming apparatus 1. The upper side and the lower side in FIG. 1 are defined as an upper side and a lower side of the image forming apparatus 1, respectively.

The image forming apparatus 1 includes: a housing 2; a sheet-supply tray 10 capable of supporting the sheet S; and an image forming device 5 configured to form an image on the sheet S.

The housing 2 has a substantially rectangular parallelepiped shape and houses the sheet-supply tray 10 and the image forming device 5. A front surface 21 of the housing 2 has an opening 2A. The housing 2 includes a front-surface cover 22 capable of exposing and closing the opening 2A.

A pivot shaft 22*a* is provided at a lower end portion of the front-surface cover 22. The front-surface cover 22 is pivotable about the pivot shaft 22*a*. The opening 2A is exposed and closed by pivotal movement of the front-surface cover 22 about the pivot shaft 22*a*. A sheet-discharge tray 23*a* is provided on an upper surface 23 of the housing 2. The sheet-discharge tray 23*a* is inclined so as to be lower at its rear portion than its front portion.

A conveyance path P for the sheet S is formed in the housing 2 so as to extend from the sheet-supply tray 10 to the sheet-discharge tray 23*a* via the image forming device 5. Sheet-supply rollers 11, separating rollers 12, and a separator pad 12*a* are provided in the housing 2.

The sheets S supported on the sheet-supply tray 10 are separated into one and the other by the sheet-supply rollers 11, the separating rollers 12, and the separator pad 12*a* and supplied one by one into the conveyance path P. The sheet S supplied into the conveyance path P is conveyed toward the image forming device 5.

The image forming device 5 is disposed over the sheet-supply tray 10 and includes four process units 50 arranged side by side in the front and rear direction. The process units 50 are mountable and removable on and from the housing 2 and provided so as to correspond respectively to black, yellow, magenta, and cyan.

The housing 2 includes a drawer 60 that supports the process units 50. Each of the process units 50 includes a drum cartridge 51 and a developing cartridge 52. The drum cartridge 51 is removably mounted on the drawer 60. The developing cartridge 52 is removably mounted on the drum cartridge 51.

The drum cartridge 51 includes a photoconductive drum 54 and an electrically charged roller 58. The photoconductive drum 54 has a substantially cylindrical shape with its axial direction coinciding with the right and left direction. The photoconductive drum 54 is rotatably supported by the drum cartridge 51. The electrically charged roller 58 extends in the right and left direction and is held in contact with an upper rear portion of the photoconductive drum 54.

The developing cartridge 52 includes a developing roller 55, a supply roller 56, and a toner container 57 containing toner as a developer. The developing roller 55 extends in the right and left direction and is provided so as to be exposed rearward from a rear end portion of the developing cartridge 52. The developing roller 55 is held in contact with an upper front portion of the photoconductive drum 54.

The supply roller 56 extends in the right and left direction and is held in contact with an upper front portion of the developing roller 55. The toner container 57 is disposed over the supply roller 56. The toner is supplied from the toner container 57 to the supply roller 56. The supply roller 56 supplies the toner to the developing roller 55. The developing roller 55 supplies the toner to the photoconductive drum 54.

An exposing unit 53 is provided over the process units 50 to expose surfaces of the respective photoconductive drums 54.

A belt 31 is provided under the photoconductive drums 54, with the conveyance path P interposed therebetween. The belt 31 is opposed to the photoconductive drums 54. The belt 31 is tensioned between a drive roller 32 and a driven roller 33 located in front of the drive roller 32. Transfer rollers 34 are opposed to the respective photoconductive drums 54, with the belt 31 interposed between each of the transfer rollers 34 and a corresponding one of the photoconductive drums 54. A belt unit 30 is constituted by the belt 31, the drive roller 32, the driven roller 33, and the transfer rollers 34.

In the image forming device 5, the surface of the photoconductive drum 54 is uniformly charged by the electrically charged roller 58, and then selectively exposed by the exposing unit 53 based on predetermined image data. As a result, an electrostatic latent image based on the image data is formed on the surface of the photoconductive drum 54.

The toner contained in the toner container 57 is positively charged between the supply roller 56 and the developing roller 55 and born on a surface of the developing roller 55. The toner born on the developing roller 55 is supplied to the electrostatic latent image formed on the surface of the photoconductive drum 54, a toner image is born on the surface of the photoconductive drum 54.

When the sheet S conveyed toward the image forming device 5 has reached a position on the belt 31, the sheet S is conveyed by the belt 31 so as to pass through positions each between the belt 31 and a corresponding one of the photoconductive drums 54. When the toner image born on the surface of the photoconductive drum 54 faces the sheet S, the toner image is transferred to the sheet S by a transfer bias applied to the transfer roller 34. Thus, the toner images born on the respective photoconductive drum 54 are transferred to the sheet S by the belt unit 30.

In the present embodiment, the belt 31 is constituted by a conveyor belt for conveying the sheet S to which the toner images are to be transferred. However, the belt 31 may be constituted by an intermediate transfer belt. In this case, the toner images are transferred to the belt, and then the toner images transferred to the belt are transferred to the sheet S.

The sheet S to which the toner images are transferred is conveyed to a fixing device 16 disposed downstream of the image forming device 5. The fixing device 16 includes a heat roller 17 and a pressure roller 18 held in pressing contact with the heat roller 17. The toner images are thermally fixed to the sheet S conveyed to the fixing device 16, while the sheet S is passing through a position between the heat roller 17 and the pressure roller 18.

The sheet S to which the toner images are thermally fixed is conveyed downstream from the fixing device 16 in the conveying direction and discharged onto the sheet-discharge tray 23*a* by a sheet-discharge roller 19.

Developing Cartridge

Figure 2A:
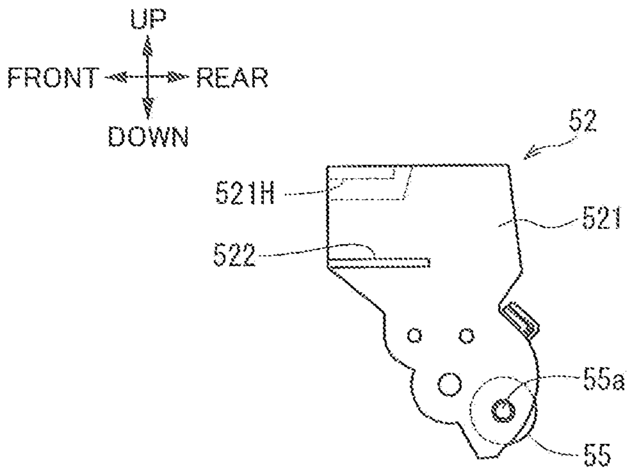
FIG. 2A is a side view of a developing cartridge.
Figure 2B:
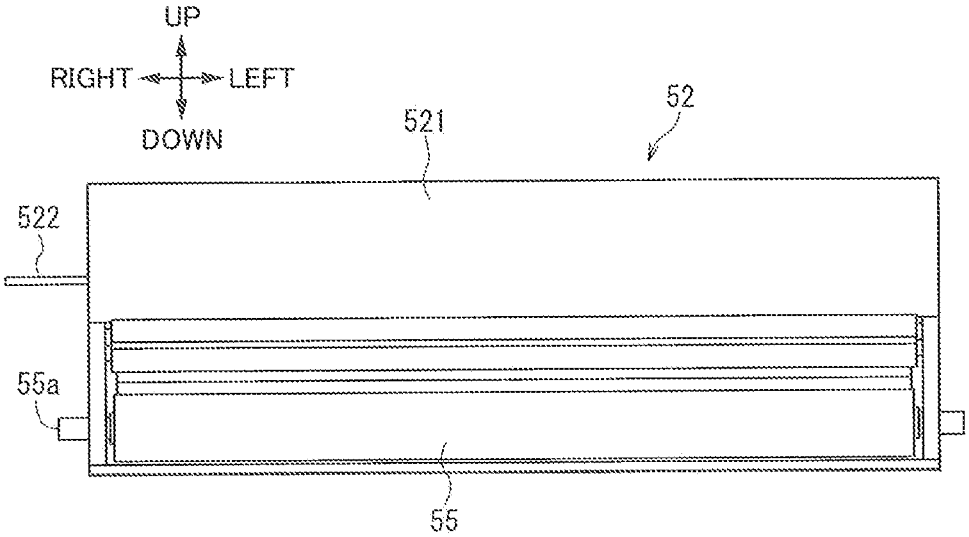
FIG. 2B is a rear view of the developing cartridge.

As illustrated in FIG. 2, each of the developing cartridges 52 includes a development frame 521 that supports a corresponding one of the developing rollers 55 rotatably. The developing roller 55 includes a roller shaft 55*a* that is supported by the development frame 521.

Opposite end portions of the roller shaft 55*a* protrude outward from the development frame 521 in the right and left direction. The development frame 521 includes a cover member 522 that is a plate member protruding outward in the right and left direction. In the present embodiment, the cover member 522 is provided on a right end portion of the development frame 521.

A handle 521H is formed at a front portion of an upper end portion of the development frame 521. A user is allowed to grasp the handle 521H when removing the developing cartridge 52 from the drum cartridge 51.

Drum Cartridge

Figure 3A:
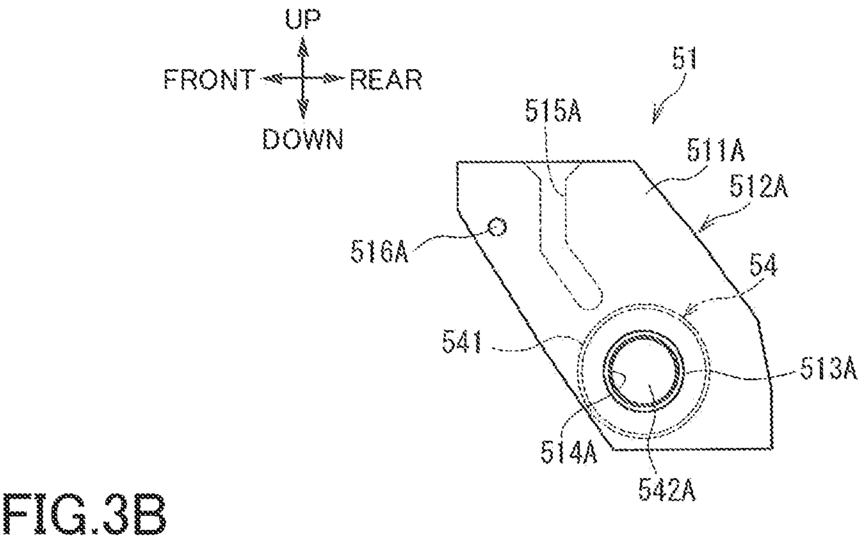
FIG. 3A is a side view of a drum cartridge.
Figure 3B:
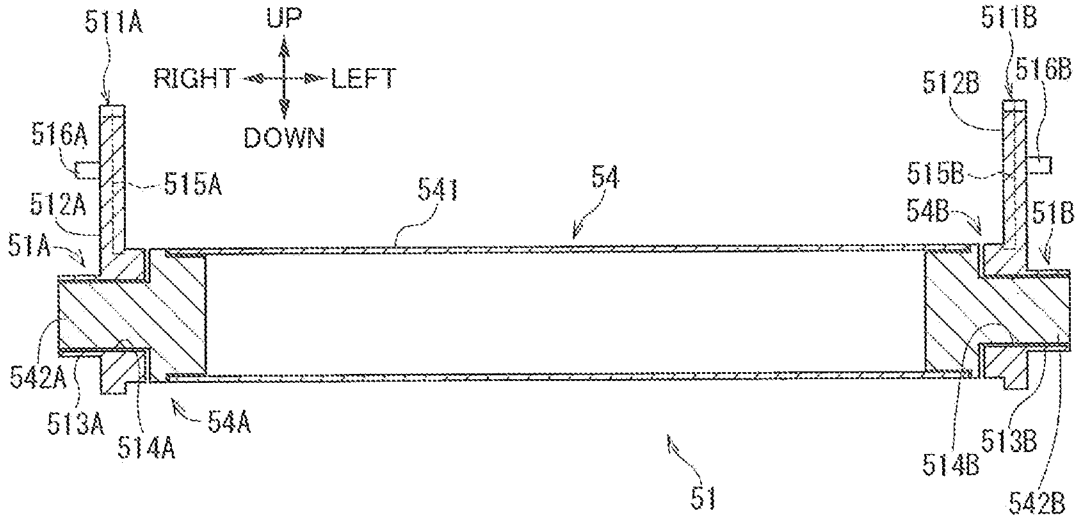
FIG. 3B is a cross-sectional view of the drum cartridge, viewed from a rear side and taken along a plane containing a rotation shaft of a photoconductive drum of the drum cartridge.

As illustrated in FIGS. 3A and 3B, each of the photoconductive drums 54 is disposed such that its axial direction coincides with the right and left direction orthogonal to the moving direction of the drawer 60. The photoconductive drum 54 includes: a drum body 541; a first drum shaft 542A protruding rightward from a right end portion of the drum body 541; and a second drum shaft 542B protruding from a left end portion of the drum body 541. The first drum shaft 542A is disposed on a first end 54A that is a right end of the photoconductive drum 54. The second drum shaft 542B is disposed on a second end 54B that is a left end of the photoconductive drum 54.

The drum cartridge 51 includes: a first drum frame 511A that supports the first end 54A of the photoconductive drum 54 rotatably; and a second drum frame 511B that supports the second end 54B of the photoconductive drum 54 rotatably. Specifically, the first drum frame 511A supports the first drum shaft 542A disposed at the first end 54A, and the second drum frame 511B supports the second drum shaft 542B disposed at the second end 54B.

The first drum frame 511A includes: a first side wall 512A extending in the up and down direction; and a first protruding portion 513A extending rightward from the first side wall 512A. A portion of the first side wall 512A at which the first protruding portion 513A is formed has a first support hole 514A for supporting the first drum shaft 542A rotatably. The first protruding portion 513A is located at a first end 51A of the drum cartridge 51.

The second drum frame 511B includes: a second side wall 512B extending in the up and down direction; and a second protruding portion 513B protruding leftward from the second side wall 512B. A portion of the second side wall 512B at which the second protruding portion 513B is formed has a second support hole 514B for supporting the second drum shaft 542B rotatably. The second protruding portion 513B is located at a second end 51B of the drum cartridge 51.

An inner left surface of the first side wall 512A has a first guide groove 515A extending substantially in the up and down direction. The first guide groove 515A is located above the first support hole 514A. An upper end of the first guide groove 515A is open, and a right end portion of the roller shaft 55*a* of the developing roller 55 is insertable in the first guide groove 515A from an upper side thereof.

An inner right surface of the second side wall 512B has a second guide groove 515B extending substantially in the up and down direction. The second guide groove 515B is located above the second support hole 514B. An upper end of the second guide groove 515B is open, and a left end portion of the roller shaft 55*a* of the developing roller 55 is insertable in the second guide groove 515B from an upper side thereof.

Figure 4:
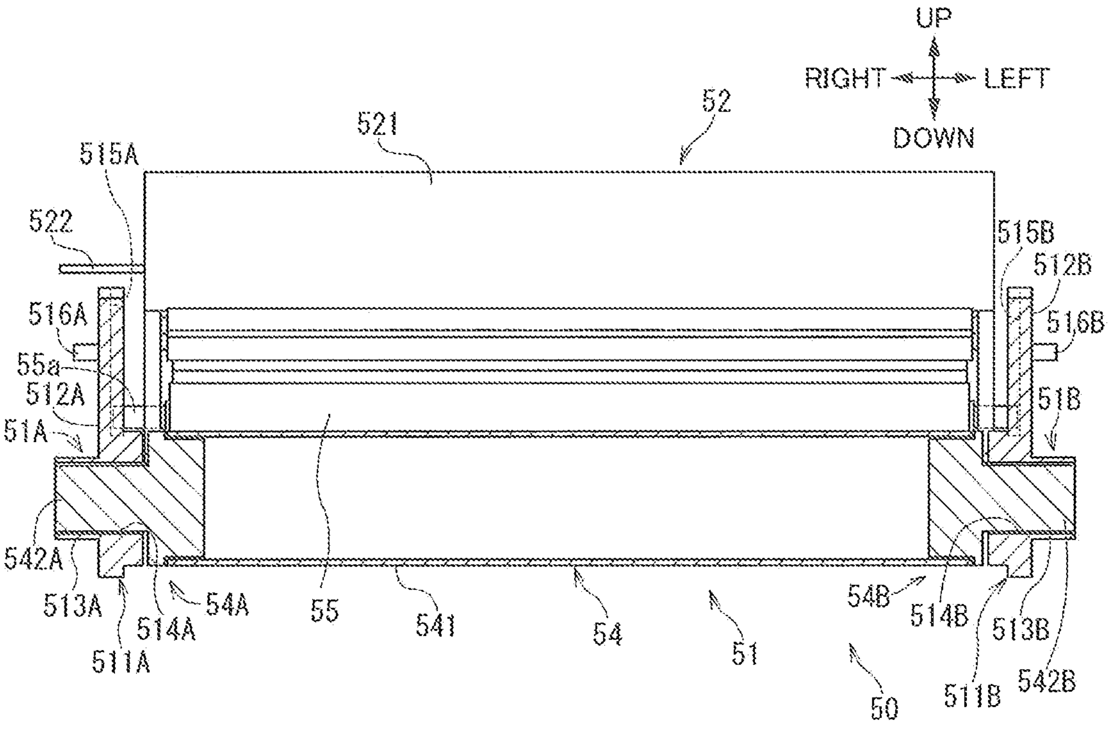
FIG. 4 is a cross-sectional view of a process unit, viewed from a rear side and taken along the plane containing the rotation shaft of the photoconductive drum in a state in which the developing cartridge is mounted on the drum cartridge.

As illustrated in FIG. 4, the developing roller 55 is mountable to the drum cartridge 51 by inserting the roller shaft 55*a* of the developing roller 55 into the first guide groove 515A and the second guide groove 515B.

A first projecting portion 516A is formed on an outer right surface of the first side wall 512A so as to project rightward from the first side wall 512A. The first projecting portion 516A projects from the first drum frame 511A so as to extend away from the second drum frame 511B. The first projecting portion 516A is one example of a projecting portion.

A second projecting portion 516B is formed on an outer left surface of the second side wall 512B so as to project leftward from the second side wall 512B. The second projecting portion 516B projects from the second drum frame 511B so as to extend away from the first drum frame 511A.

Drawer

Figure 5:
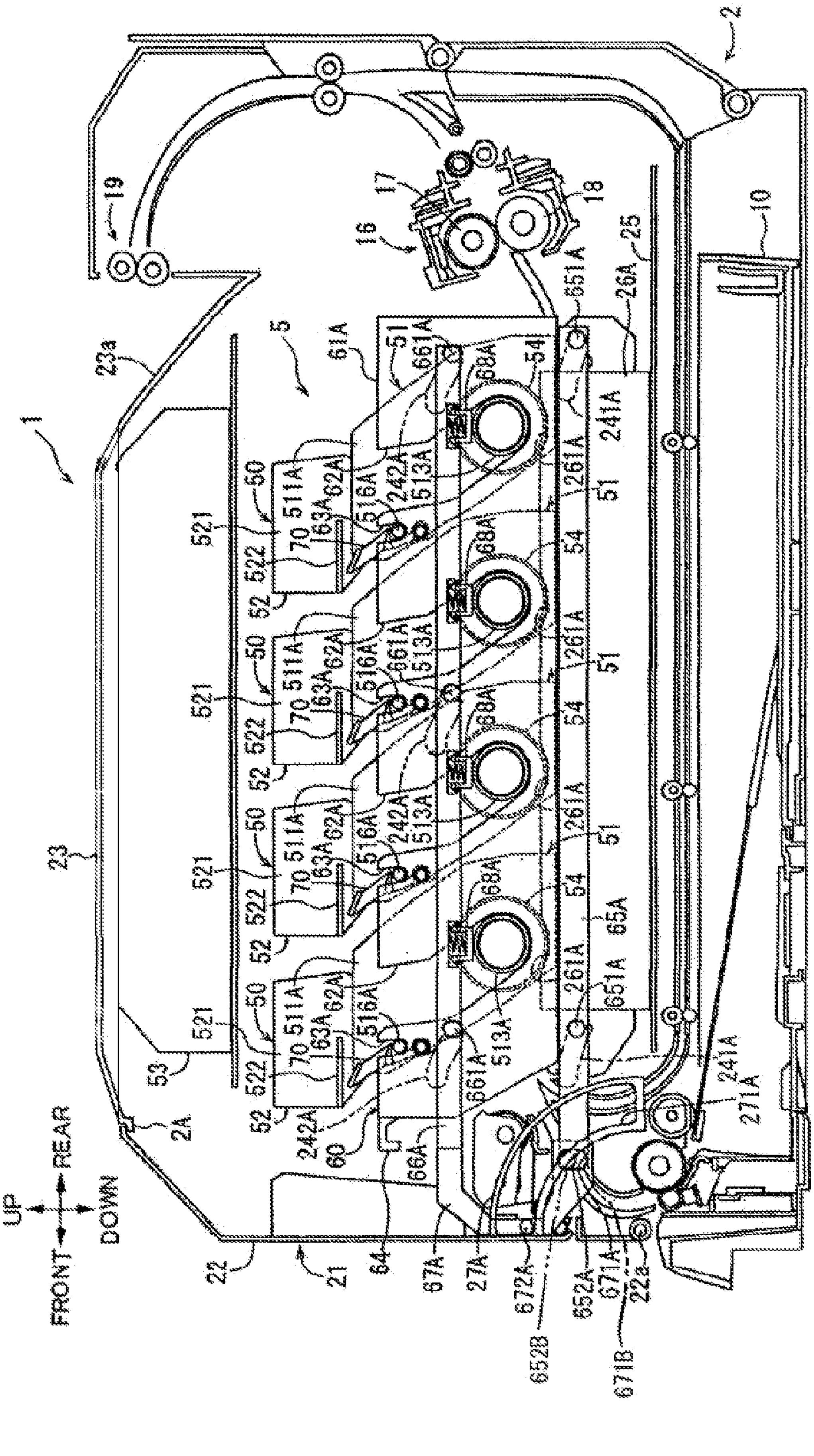
FIG. 5 is a side elevational view in cross section, illustrating the image forming apparatus in a state in which the drawer is located at the inner position, and the drawer guides and the urging rails are located at their respective positioning positions.
Figure 6:
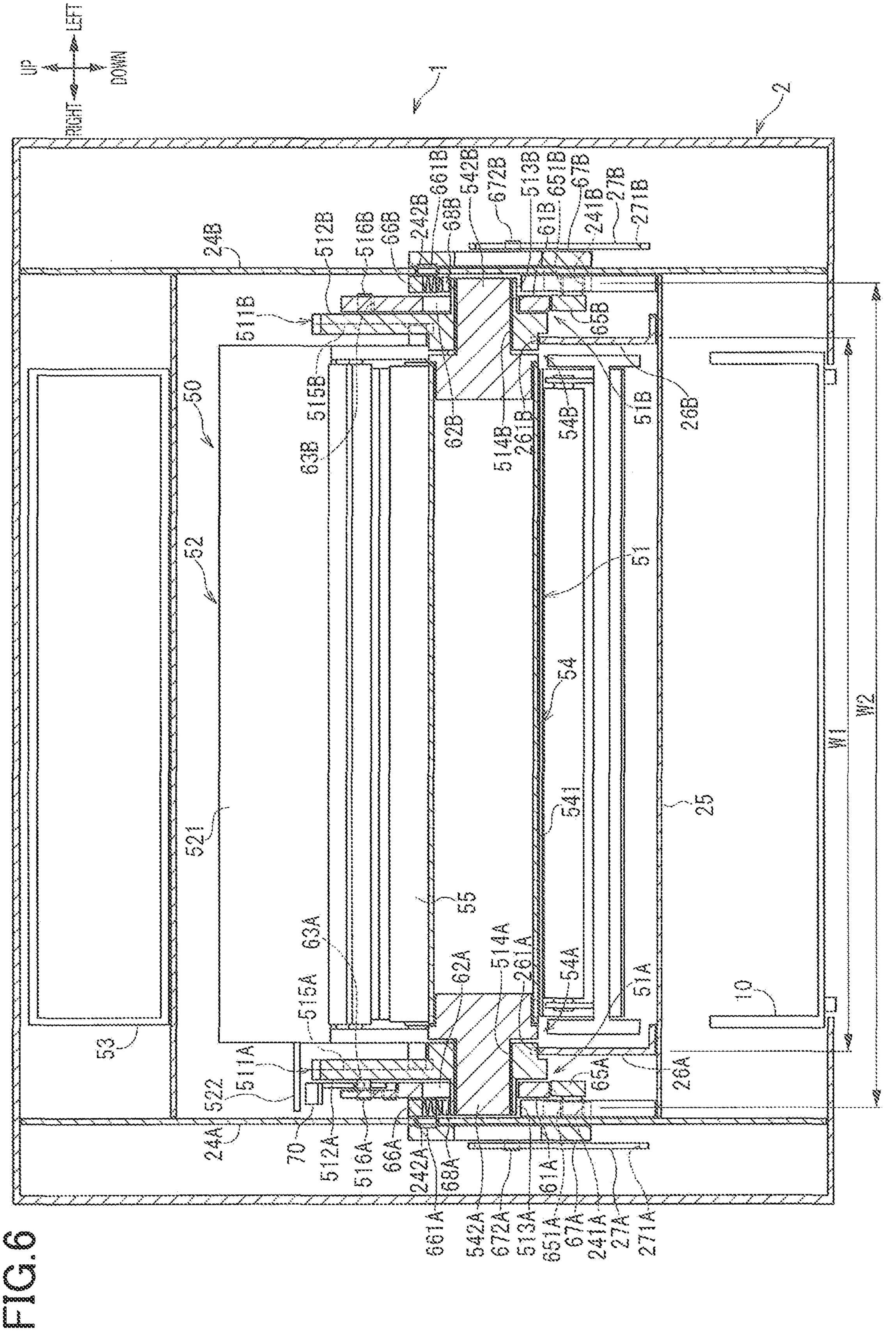
FIG. 6 is a cross-sectional view of the image forming apparatus, viewed from a rear side and taken along the plane containing the rotation shaft of the photoconductive drum in the state in which the drawer is located at the inner position, and the drawer guides and the urging rails are located at their respective positioning positions.

As illustrated in FIGS. 5 and 6, the drawer 60 is a substantially rectangular frame member capable of supporting the four process units 50. The drawer 60 includes: a first side frame 61A disposed to the right of the process units 50 and extending in the front and rear direction; and a second side frame 61B disposed to the left of the process units 50 and extending in the front and rear direction.

The first side frame 61A has four first support grooves 62A arranged in the front and rear direction and each extending substantially in the up and down direction. The second side frame 61B has four second support grooves 62B arranged in the front and rear direction and each extending substantially in the up and down direction. Each of the number of the first support grooves 62A and the number of the second support grooves 62B corresponds to the number of the process units 50 supported by the respective first support grooves 62A and the respective second support grooves 62B.

Upper ends of the respective first support grooves 62A are open so as to allow the first protruding portions 513A of the respective drum cartridges 51 to be inserted into the respective first support grooves 62A from an upper side thereof. Upper ends of the respective second support grooves 62B are open so as to allow the second protruding portions 513B of the respective drum cartridges 51 to be inserted into the respective second support grooves 62B from an upper side thereof. The drum cartridges 51 are mountable to the drawer 60 by inserting the first protruding portions 513A into the respective first support grooves 62A and inserting the second protruding portions 513B into the respective second support grooves 62B.

The first protruding portions 513A of the respective drum cartridges 51 mounted to the drawer 60 protrude outward from the first side frame 61A in the right direction. That is, the first protruding portions 513A of the respective first drum frames 511A protrude from the first side frame 61A so as to extend away from the second side frame 61B.

The second protruding portions 513B of the respective drum cartridges 51 mounted to the drawer 60 protrude outward from the second side frame 61B in the left direction. That is, the second protruding portions 513B of the respective second drum frames 511B protrude from the second side frame 61B so as to extend away from the first side frame 61A.

With this configuration, when the drum cartridge 51 is mounted to the drawer 60, the first protruding portion 513A is supported by the first side frame 61A, and the second protruding portion 513B is supported by the second side frame 61B. That is, when the drum cartridge 51 is mounted to the drawer 60, the first side frame 61A supports the first end 51A of the drum cartridge 51, and the second side frame 61B supports the second end 51B of the drum cartridge 51.

The first side frame 61A has first guide grooves 63A formed in front of the respective first support grooves 62A and each extending substantially in the up and down direction. Upper ends of the respective first guide grooves 63A are open so as to allow the first projecting portions 516A of the respective drum cartridges 51 to be inserted into the respective first guide grooves 63A from an upper side thereof.

The second side frame 61B has second guide grooves 63B formed in front of the respective second support grooves 62B and each extending substantially in the up and down direction. Upper ends of the respective second guide grooves 63B are open so as to allow the second projecting portions 516B of the respective drum cartridges 51 to be inserted into the respective second guide grooves 63B from an upper side thereof.

The first projecting portions 516A are inserted in the respective first guide grooves 63A, and the second projecting portions 516B are inserted in the respective second guide grooves 63B, making it possible to prevent the drum cartridges 51 mounted to the drawer 60 from pivoting about the first drum shaft 542A and the second drum shaft 542B.

The first side frame 61A is provided with lock members 70 that prevent the first projecting portions 516A inserted in the respective first guide grooves 63A, from coming out of the respective first guide grooves 63A.

Structure for Supporting Drum Cartridge and Drawer

As illustrated in FIGS. 5 and 6, the housing 2 includes vertical frames 24A, 24B each extending in the front and rear direction and the up and down direction. The vertical frame 24A is disposed at a right end portion of the housing 2 in the housing 2. The vertical frame 24B is disposed at a left end portion of the housing 2 in the housing 2.

The vertical frame 24A has two lower guide holes 241A and three upper guide holes 242A. The vertical frame 24B has two lower guide holes 241B and three upper guide holes 242B. Each of the lower guide holes 241A, 241B and the upper guide holes 242A, 242B is an elongated hole extending substantially in the front and rear direction and inclined so as to be higher at its front portion than at its rear portion. The two lower guide holes 241A are located apart from each other in the front and rear direction. The two lower guide holes 241B are located apart from each other in the front and rear direction. The three upper guide holes 242A are formed over the lower guide holes 241A and located apart from each other in the front and rear direction. The three upper guide holes 242B are formed over the lower guide holes 241B and located apart from each other in the front and rear direction.

A drawer guide 65A is provided in the housing 2 at a position located on an inner left side of the vertical frame 24A. A drawer guide 65B is provided in the housing 2 at a position located on an inner right side of the vertical frame 24B. Each of the drawer guides 65A, 65B is a rail member extending in the front and rear direction. The first side frame 61A is supported on the drawer guide 65A so as to be movable in the front and rear direction. The second side frame 61B is supported on the drawer guide 65B so as to be movable in the front and rear direction.

The drawer guide 65A includes two guide pins 651A protruding rightward and outward. The drawer guide 65B includes two guide pins 651B protruding leftward and outward. The guide pins 651A are provided so as to correspond to the respective lower guide holes 241A and slidably inserted in the respective lower guide holes 241A. The guide pins 651B are provided so as to correspond to the respective lower guide holes 241B and slidably inserted in the respective lower guide holes 241B.

Since the guide pins 651A, 651B are inserted in the respective lower guide holes 241A, 241B, the drawer guides 65A, 65B are supported by the respective vertical frames 24A, 24B. The drawer guide 65A is movable in the front and rear direction and the up and down direction relative to the vertical frame 24A within a region in which the guide pins 651A are slidable in the respective lower guide holes 241A. The drawer guide 65B is movable in the front and rear direction and the up and down direction relative to the vertical frame 24B within a region in which the guide pins 651B are slidable in the respective lower guide holes 241B.

An urging rail 66A is provided in the housing 2 at a position located on an inner left side of the vertical frame 24A. An urging rail 66B is provided in the housing 2 at a position located on an inner right side of the vertical frame 24B. Each of the urging rails 66A, 66B is a rail member extending in the front and rear direction and located above a corresponding one of the drawer guides 65A, 65B.

The urging rail 66A includes three guide pins 661A protruding rightward and outward. The urging rail 66B includes three guide pins 661B protruding leftward and outward. The guide pins 661A are provided so as to correspond to the respective upper guide holes 242A and slidably inserted in the respective upper guide holes 242A. The guide pins 661B are provided so as to correspond to the respective upper guide holes 242B and slidably inserted in the respective upper guide holes 242B.

Since the guide pins 661A, 661B are inserted in the respective upper guide holes 242A, 242B, the urging rails 66A, 66B are supported by the respective vertical frames 24A, 24B. The urging rail 66A is movable in the front and rear direction and the up and down direction relative to the vertical frame 24A within a region in which the guide pins 661A are slidable in the respective upper guide holes 242A. The urging rail 66B is movable in the front and rear direction and the up and down direction relative to the vertical frame 24B within a region in which the guide pins 661B are slidable in the respective upper guide holes 242*b*.

A coupling arm 67A is disposed in front of the drawer guide 65A and the urging rail 66A. A coupling arm 67B is disposed in front of the drawer guide 65B and the urging rail 66B. Front end portions of the drawer guide 65A and the urging rail 66A are coupled to the coupling arm 67A. Front end portions of the drawer guide 65B and the urging rail 66B are coupled to the coupling arm 67B.

A coupling pin 652A protruding rightward and outward is formed on the front end portion of the drawer guide 65A. A coupling pin 652B protruding leftward and outward is formed on the front end portion of the drawer guide 65B. A lower end portion of the coupling arm 67A has a coupling hole 671A in which the coupling pin 652A is inserted. A lower end portion of the coupling arm 67B has a coupling hole 671B in which the coupling pin 652B is inserted.

Each of the coupling holes 671A, 671B is elongated in the up and down direction. The coupling pins 652A, 652B are inserted in the respective coupling holes 671A, 671B so as to be slidable in the up and down direction. The drawer guides 65A, 65B are coupled to the respective coupling arms 67A, 67B so as to be movable in the up and down direction. The urging rails 66A, 66B are coupled and fixed to the respective coupling arms 67A, 67B.

An engaging pin 672A protruding rightward and outward is formed on a front end portion of the coupling arm 67A. An engaging pin 672B protruding leftward and outward is formed on a front end portion of the coupling arm 67B. The front-surface cover 22 of the housing 2 includes link arms 27A, 27B. Each of the link arms 27A, 27B has an arc shape curved rearward and downward from the front-surface cover 22. The link arms 27A, 27B respectively have engaging holes 271A, 271B engageable with the respective engaging pins 672A, 672B. Each of the engaging holes 271A, 271B has an arc shape curved so as to be lower at its rear portion than at its front portion.

With this configuration, the drawer 60 is movable between an inner position (illustrated in FIG. 5) and an outer position (illustrated in FIG. 8) in the front and rear direction. That is, the moving direction of the drawer 60 coincides with the front and rear direction, and a side nearer to the outer position than to the inner position in the moving direction of the drawer 60 is a front side, and a side nearer to the inner position than to the outer position in the moving direction of the drawer 60 is a rear side.

As illustrated in FIG. 5, when the drawer 60 is located at the inner position in the state in which the drum cartridge 51 is mounted to the drawer 60, the drum cartridge 51 and the developing cartridge 52 are contained in the housing 2.

Figure 8:
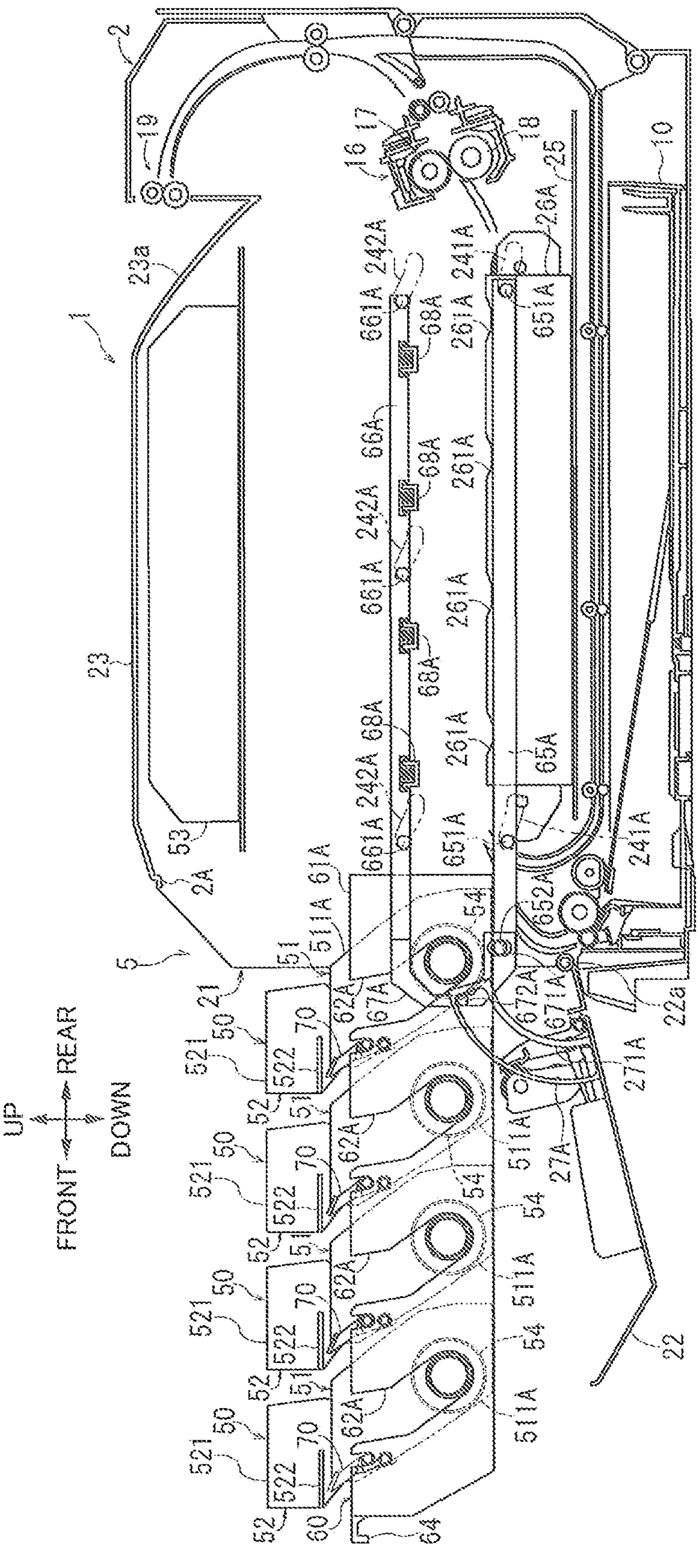
FIG. 8 is a side elevational view in cross section, illustrating the image forming apparatus in a state in which the drawer is located at an outer position, and the drawer guides and the urging rails are located at their respective positioning cancel positions.

As illustrated in FIG. 8, when the drawer 60 is located at the outer position in the state in which the drum cartridge 51 is mounted to the drawer 60, at least a portion of the drum cartridge 51 and the developing cartridge 52 is exposed to the outside of the housing 2. When the drawer 60 is located at the outer position, the drum cartridge 51 and the developing cartridge 52 exposed to the outside of the housing 2 are mountable on and removable from the drawer 60.

The drawer guides 65A, 65B and the urging rails 66A, 66B are movable in the front and rear direction between (i) their respective positioning positions (illustrated in FIG. 5) at which the drum cartridges 51 are positioned with respect to the housing 2 and (ii) their respective positioning cancel positions (illustrated in FIG. 7) at which the positioning of the drum cartridges 51 with respect to the housing 2 is canceled, and the drawer 60 is movable in the front and rear direction.

As illustrated in FIG. 5, when the front-surface cover 22 of the housing 2 is closed, the drawer 60 is located at the inner position, and the drawer guides 65A, 65B and the urging rails 66A, 66B are located at their respective positioning positions.

When the drawer guides 65A, 65B and the urging rails 66A, 66B are located at their respective positioning positions, the guide pins 651A, 651B are located at rear end portions of the respective lower guide holes 241A, 241B, and the guide pins 661A, 661B are located at rear end portions of the respective upper guide holes 242A, 242B. Thus, each of the drawer guides 65A, 65B and the urging rails 66A, 66B is located at a rear and lower portion of its movable region.

The housing 2 includes a horizontal frame 25 extending in the horizontal direction between the right and left vertical frames 24A, 24B. The horizontal frame 25 is disposed below the drawer guides 65A, 65B. A first support plate 26A and a second support plate 26B are provided upright on the horizontal frame 25. Each of the first support plate 26A and the second support plate 26B is a plate member extending in the front and rear direction.

The first support plate 26A is disposed on an inner side of the first side frame 61A in the right and left direction and capable of supporting the first drum frames 511A from a lower side thereof. The second support plate 26B is disposed on an inner side of the second side frame 61B in the right and left direction and capable of supporting the second drum frames 511B from a lower side thereof.

An upper end of the first support plate 26A has positioning recessed portions 261A formed respectively at positions corresponding to the positions of the respective drum cartridges 51 in the front and rear direction. When the drawer guide 65A and the urging rail 66A are located at their respective positioning positions, the first side walls 512A of the respective first drum frames 511A are supported by the respective positioning recessed portions 261A from below.

An upper end of the second support plate 26B has positioning recessed portions 261B formed respectively at positions corresponding to the positions of the respective drum cartridges 51 in the front and rear direction. When the drawer guide 65B and the urging rail 66B are located at their respective positioning positions, the second side walls 512B of the respective second drum frames 511B are supported by the respective positioning recessed portions 261B from below.

The first support plate 26A and the second support plate 26B are sheet-metal members formed by press working using the same metal mold and having the same shape. This ensures high accuracy for aligning the positions of the positioning recessed portions 261A of the first support plate 26A and the positioning recessed portions 261B of the second support plate 26B which support the drum cartridges 51. Thus, it is possible to reduce positional misalignment of the photoconductive drums 54 when the drum cartridges 51 are positioned.

The urging rail 66A is provided with first pressing members 68A respectively at positions corresponding to the positions of the respective drum cartridges 51 in the front and rear direction. The first pressing members 68A are arranged on a right and outer side of the first side frame 61A. When the drawer guide 65A and the urging rail 66A are located at their respective positioning positions, the first pressing members 68A press the first protruding portions 513A of the respective first drum frames 511A downward.

The urging rail 66B is provided with second pressing members 68B respectively at positions corresponding to the positions of the respective drum cartridges 51 in the front and rear direction. The second pressing members 68B are arranged on a left and outer side of the second side frame 61B. When the drawer guide 65B and the urging rail 66B are located at their respective positioning positions, the second pressing members 68B press the second protruding portions 513B of the respective second drum frames 511B downward.

Thus, when the drawer guides 65A, 65B and the urging rails 66A, 66B are located at their respective positioning positions, the drum cartridges 51 are held by the first support plate 26A and the first pressing members 68A from lower and upper sides and held by the second support plate 26B and the second pressing members 68B from lower and upper sides, thereby positioning the drum cartridges 51. This configuration enables stable positioning of the drum cartridges 51 with respect to the housing 2.

In this case, the first pressing members 68A are disposed on a right and outer side of the first support plate 26A, and the second pressing members 68B are disposed on a left and outer side of the second support plate 26B. Accordingly, the distance W2 in the right and left direction between (i) the position at which each of the first pressing members 68A contacts a corresponding one of the first protruding portions 513A and (ii) the position at which each of the second pressing members 68B contacts a corresponding one of the second protruding portions 513B is greater than the distance W1 in the right and left direction between the position at which the first support plate 26A contacts the first drum frames 511A and the position at which the second support plate 26B contacts the second drum frames 511B.

With this configuration, each of the drum cartridges 51 can be effectively pressed by the first support plate 26A and a corresponding one of the first pressing members 68A and by the second support plate 26B and a corresponding one of the second pressing members 68B, resulting in higher accuracy for positioning the drum cartridges 51.

The first support plate 26A supports the first side walls 512A of the respective first drum frames 511A from a lower side thereof in the present embodiment but may support the first protruding portions 513A from a lower side thereof. Likewise, the second support plate 26B supports the second side walls 512B of the respective second drum frames 511B from a lower side thereof in the present embodiment but may support the second protruding portions 513B from a lower side thereof.

In this case, the image forming apparatus 1 may be configured such that positions at which the first support plate 26A contacts the respective first protruding portions 513A are located on an inner side, in the right and left direction, of positions at which the first pressing members 68A contact the respective first protruding portions 513A, and positions at which the second support plate 26B contacts the respective second protruding portions 513B are located on an inner side, in the right and left direction, of positions at which the second pressing members 68B contact the respective second protruding portions 513B.

That is, the image forming apparatus 1 may be configured such that the distance W2 in the right and left direction between (i) the position at which each of the first pressing members 68A contacts a corresponding one of the first protruding portions 513A and (ii) the position at which each of the second pressing members 68B contacts a corresponding one of the second protruding portions 513B is greater than the distance in the right and left direction between the positions at which the first support plate 26A contacts the respective first protruding portions 513A and the positions at which the second support plate 26B contacts the respective second protruding portions 513B. This configuration enables effective pressing of the drum cartridges 51 to increase the accuracy for positioning the drum cartridges 51.

Figure 7:
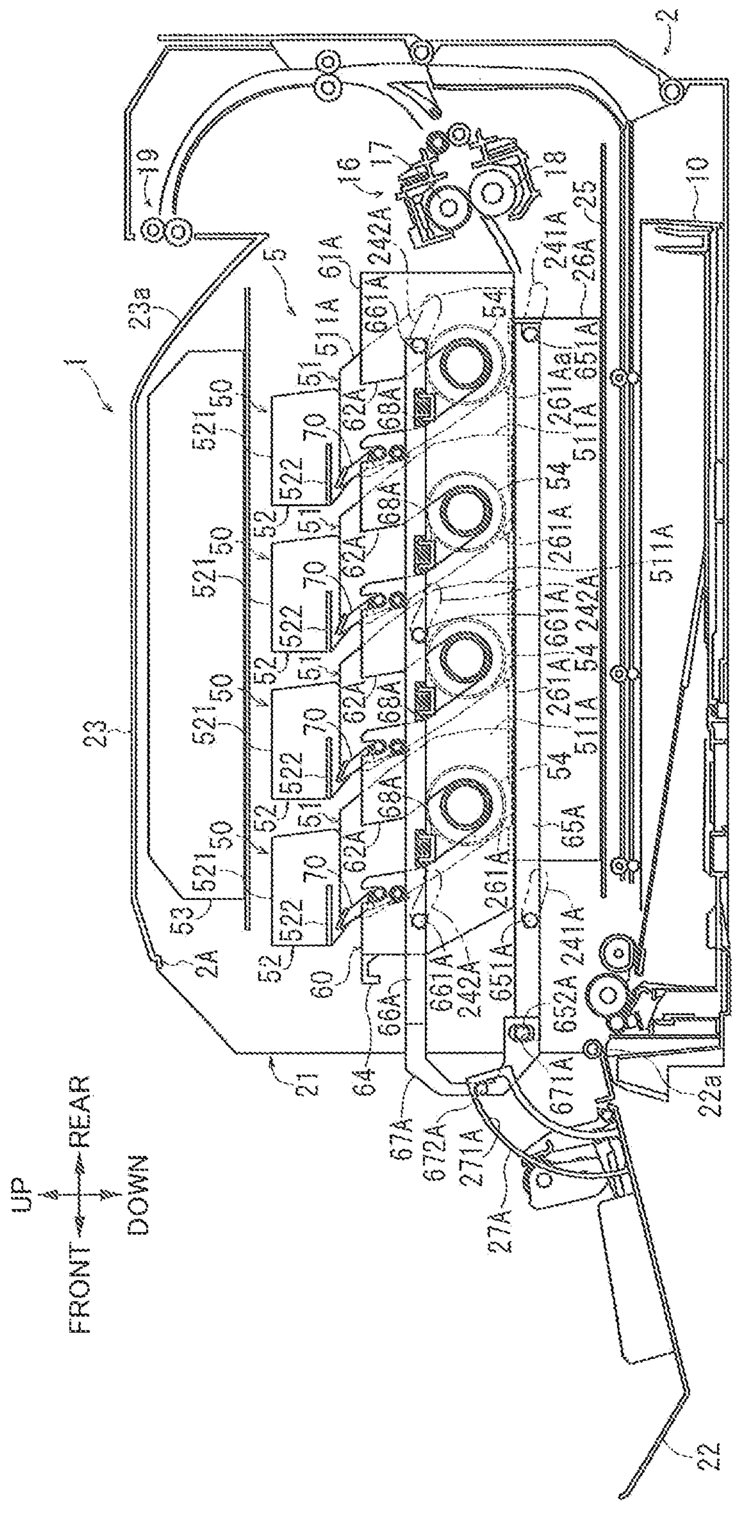
FIG. 7 is a side elevational view in cross section, illustrating the image forming apparatus in a state in which the drawer is located at the inner position, and the drawer guides and the urging rails are located at their respective positioning cancel positions.

When the front-surface cover 22 of the housing 2 is opened in the state illustrated in FIG. 5, as illustrated in FIG. 7, the link arms 27A, 27B are moved frontward, causing the engaging pins 672A, 672B to be engaged with rear edges of the respective engaging holes 271A, 271B, whereby the coupling arms 67A, 67B are pulled frontward. When the coupling arms 67A, 67B are pulled frontward, the drawer guides 65A, 65B and the urging rails 66A, 66B are moved frontward to their respective positioning cancel positions.

In this case, since the guide pins 651A, 651B are slid from the rear end portions to the front end portions of the respective lower guide holes 241A, 241B with frontward movement of the drawer guides 65A, 65B, the drawer guides 65A, 65B are also moved upward. Likewise, since the guide pins 661A, 661B are slid from the rear end portions to the front end portions of the respective upper guide holes 242A, 242B with frontward movement of the urging rails 66A, 66B, the urging rails 66A, 66B are also moved upward.

While an amount of upper movement of each of the urging rails 66A, 66B is set to be greater than an amount of upper movement of each of the drawer guides 65A, 65B when the front-surface cover 22 is opened, the drawer guides 65A, 65B are coupled to the respective coupling arms 67A, 67B so as to be movable in the up and down direction, making it possible to absorb a difference between the amount of upper movement of each of the urging rails 66A, 66B and the amount of upper movement of each of the drawer guides 65A, 65B.

When the drawer guides 65A, 65B are moved frontward and upward, the drawer 60 supported by the drawer guides 65A, 65B are moved upward with the drum cartridges 51, thereby canceling the state in which the drum cartridges 51 are supported by the first support plate 26A and the second support plate 26B.

When the urging rails 66A, 66B are moved frontward and upward, each of the first pressing members 68A and the second pressing members 68B is moved from a position located over a corresponding one of the first protruding portions 513A of the respective first drum frames 511A and the second protruding portions 513B of the respective second drum frames 511B, to a position located in front of the corresponding one of the first protruding portions 513A and the second protruding portions 513B, thereby canceling the state in which each of the first pressing members 68A and the second pressing members 68B presses a corresponding one of the first protruding portions 513A and the second protruding portions 513B.

In this case, since the amount of upper movement of each of the urging rails 66A, 66B is set to be greater than the amount of upper movement of each of the drawer guides 65A, 65B, it is possible to smoothly cancel the state in which each of the first pressing members 68A and the second pressing members 68B presses a corresponding one of the first protruding portions 513A and the second protruding portions 513B. It is also possible to move the drawer 60 from the inner position to the outer position without collision or interference between each of the first pressing members 68A and the second pressing members 68B and a corresponding one of the first protruding portions 513A and the second protruding portions 513B.

Thus, when the drawer guides 65A, 65B and the urging rails 66A, 66B are located at their respective positioning cancel positions, the state in which the drum cartridges 51 are pressed by the respective first pressing members 68A and the respective second pressing members 68B and the state in which the drum cartridges 51 are supported by the first support plate 26A and the second support plate 26B are canceled. This cancels the positioning of the drum cartridges 51 with respect to the housing 2, making the drawer 60 movable in the front and rear direction.

When the front-surface cover 22 is opened, the drawer 60 becomes movable in the front and rear direction. The user in this state can grasp a handle 64 of the drawer 60 and pull the drawer 60 frontward to move the drawer 60 to the outer position as illustrated in FIG. 8. In the state in which the drawer 60 is located at the outer position, the drum cartridges 51 and the developing cartridges 52 of the process units 50 exposed to the outside of the housing 2 are mountable to and removable from the drawer 60.

The drawer 60 can be moved to the inner position by pressing the drawer 60 located at the outer position, rearward. When the front-surface cover 22 is closed in the state in which the drawer guides 65A, 65B and the urging rails 66A, 66B are located at their respective positioning cancel positions as a result of opening of the front-surface cover 22, the engaging pins 672A, 672B are engaged with front edges of the respective engaging holes 271A, 271B, whereby the coupling arms 67A, 67B are pressed rearward. When the coupling arms 67A, 67B are pressed rearward, the drawer guides 65A, 65B and the urging rails 66A, 66B are moved rearward to their respective positioning positions.

Lock Member and Cover Member

Figure 9:
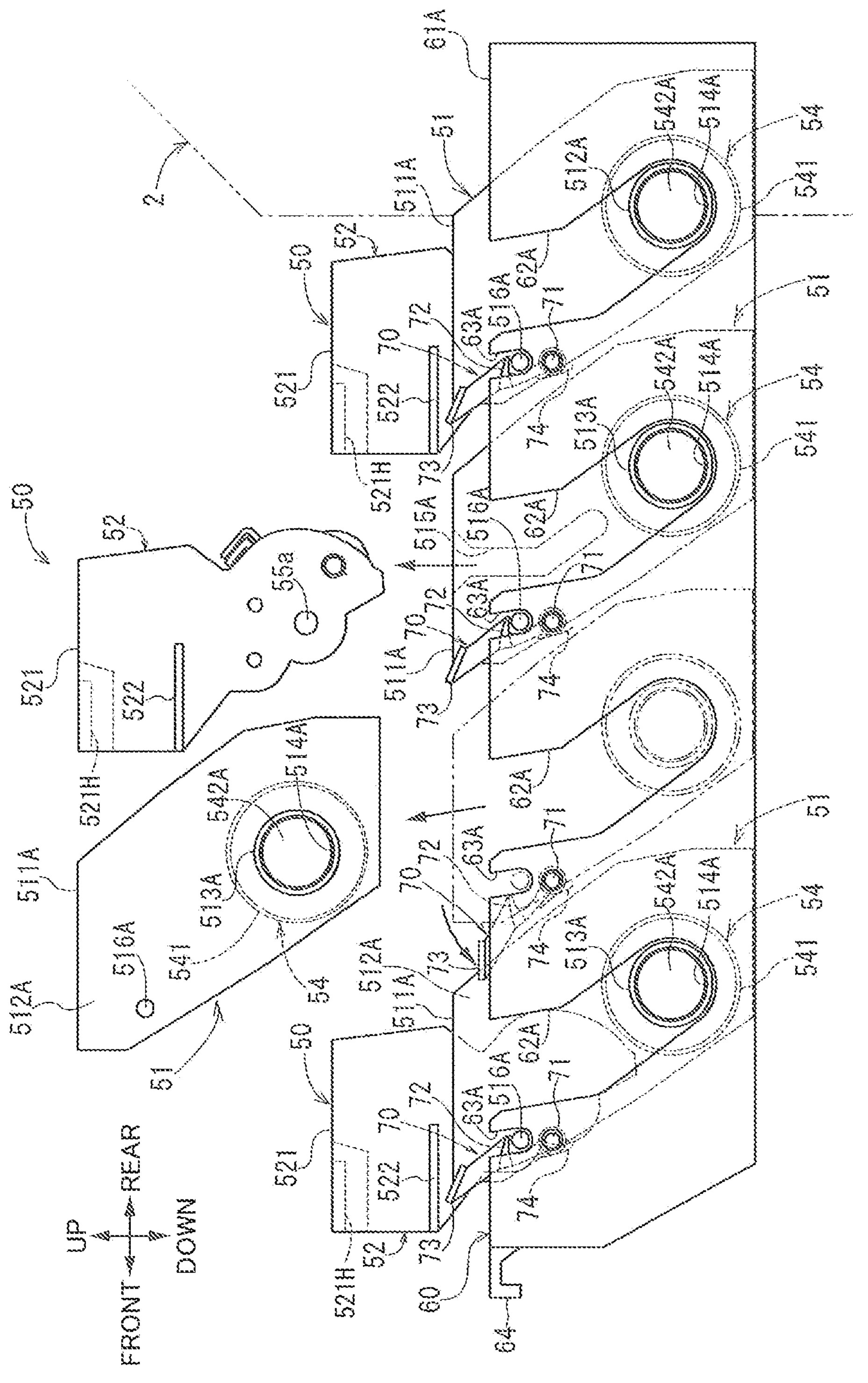
FIG. 9 is a side elevational view in cross section, illustrating the drawer in a state in which the developing cartridge and the drum cartridge are mounted.
Figure 10:
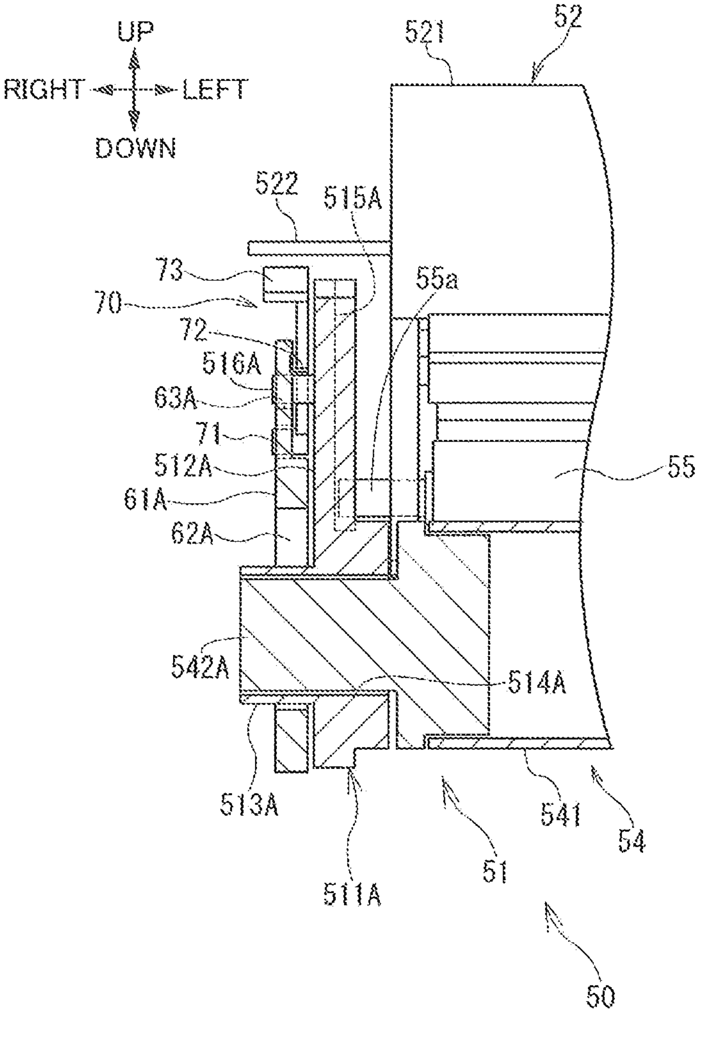
FIG. 10 is a partial cross-sectional view of the drawer in the state in which the developing cartridge and the drum cartridge are mounted.

As illustrated in FIGS. 9 and 10, each of the lock members 70 includes: a pivot shaft 71 pivotably supported by the first side frame 61A of the drawer 60; a claw 72 and an operation portion 73 supported by the pivot shaft 71 so as to be pivotable together with the pivot shaft 71; and an urging spring 74 that urges the claw 72 and the operation portion 73.

Each of the lock members 70 is movable between (i) a lock position at which a corresponding one of the drum cartridges 51 is locked in the drawer 60 in the state in which the drum cartridge 51 is mounted to the drawer 60 and (ii) a release position at which the lock between the drum cartridge 51 and the drawer 60 is released.

FIG. 9 illustrates a state in which each of the first, third, and fourth lock members 70 from the front is located at the lock position, and the second lock member 70 from the front is located at the release position.

When the lock member 70 is located at the lock position, the claw 72 is located above the first projecting portion 516A protruding from the first drum frame 511A and is engaged with the first projecting portion 516A to be moved upward, thereby restricting the upward movement of the first projecting portion 516A.

That is, since the lock member 70 located at the lock position locks the drum cartridge 51 in the drawer 60, it is possible to prevent the drum cartridge 51 from being disengaged from the drawer 60 by the first projecting portion 516A coming out of the first guide groove 63A. Also, the restriction of the movement of the first projecting portion 516A prevents the drum cartridge 51 from moving with respect to the drawer 60.

When the lock member 70 is located at the release position, the claw 72 is located in front of the first projecting portion 516A, allowing the first projecting portion 516A to move upward without engaging the claw 72. That is, the lock members 70 located at the release position releases the lock between the drum cartridge 51 and the drawer 60, allowing the drum cartridge 51 to be disengaged from the drawer 60 by the first projecting portion 516A coming out of the first guide groove 63A.

The urging spring 74 urges the claw 72 and the operation portion 73 in a direction in which the lock member 70 moves toward the lock position. Without operation of the operation portion 73, the lock members 70 is moved to the lock position by an urging force of the urging spring 74, so that the operation portion 73 is moved to a relatively upper position.

When the operation portion 73 of the lock member 70 located at the lock position is operated and pressed downward, the operation portion 73 is moved to a relatively lower position against the urging force of the urging spring 74, so that the lock member 70 is moved to the release position. Thus, the operation portion 73 is configured to switch the position of the lock member 70 between the lock position and the release position.

As illustrated in FIG. 10, a portion of the first side frame 61A to which each of the lock members 70 is mounted is less in thickness in the right and left direction than the other portion, and the lock member 70 is disposed so as not to lie off a left surface of the first side frame 61A toward an inner side in the right and left direction. A right end portion of the operation portion 73 protrudes to a position located on a right and outer side of the first side frame 61A. That is, the operation portion 73 protrudes from the first side frame 61A in a direction away from the second side frame 61B in the right and left direction.

The cover member 522 provided on the development frame 521 of each of the developing cartridges 52 is a plate member extending in the horizontal direction. The cover member 522 covers at least a portion of the operation portion 73 of the lock members 70 which protrudes outward from the first side frame 61A in the right and left direction in the state in which the corresponding drum cartridge 51 is mounted to the drawer 60, and the developing cartridge 52 is mounted to the drum cartridge 51.

In the present embodiment, the cover member 522 protrudes from the development frame 521 to a position located on a right and outer side of the first side frame 61A above the operation portion 73, and the cover member 522 covers substantially the entirety of an upper side of the operation portion 73. That is, an area occupied by the cover member 522 overlaps an area occupied by the operation portion 73 in plan view.

To remove the developing cartridge 52 and the drum cartridge 51 of the process unit 50 mounted to the drawer 60, the user first opens the front-surface cover 22 of the housing 2 and pulls the drawer 60 located at the inner position frontward to move the drawer 60 to the outer position as illustrated in FIG. 9.

The user then grasps the handle 521H of the developing cartridge 52 from a front and upper side of the drawer 60 located at the outer position and lifts the developing cartridge 52 upward to remove the developing cartridge 52 from the drum cartridge 51. It is noted that FIG. 9 illustrates a situation in which the developing cartridge 52 is removed from the drum cartridge 51 in the third process unit 50 from the front.

In this case, the drum cartridge 51 is locked by the lock member 70 located at the lock position to prevent the drum cartridge 51 from moving with respect to the drawer 60, making it easy to remove the developing cartridge 52.

At least a portion (i.e., an upper portion) of the operation portion 73 of the lock member 70 is covered with the cover member 522 in the state in which the developing cartridge 52 is mounted to the drum cartridge 51, making it difficult for the user to press the operation portion 73 down from a front and upper side of the drawer 60, making it possible to keep the lock member 70 at the lock position. In the case where the user views the drawer 60 from a front and upper side thereof, the operation portion 73 is hidden by the cover member 522 and not visible to the user, thereby preventing the user from having an intension of operating the operation portion 73.

This prevents the user from performing misoperation of the operation portion 73 of the lock member 70 and removing the drum cartridge 51 from the drawer 60 with the developing cartridge 52 when removing the developing cartridge 52 from the drum cartridge 51.

When the user removes the drum cartridge 51 from the drawer 60 after removing the developing cartridge 52 from the drum cartridge 51, the user can operate the operation portion 73 because an upper side of the operation portion 73 of the lock member 70 is not covered with the cover member 522.

Accordingly, the user can remove the drum cartridge 51 from the drawer 60 by lifting the drum cartridge 51 upward after moving the lock member 70 from the lock position to the release position by pressing the operation portion 73 of the lock member 70 down. It is noted that FIG. 9 illustrates a situation in which the second drum cartridge 51 from the front is removed from the drawer 60.

The lock member 70 is provided on the first side frame 61A of the drawer 60 and located on an outer side of the first side wall 512A of the first drum frame 511A of the drum cartridge 51 in the right and left direction. This configuration prevents the lock member 70 from interfering with mounting and removal of the drum cartridge 51 to and from the drawer 60 when compared with the case where the lock member 70 is disposed at another position.

In the drawer 60 configured to support the drum cartridge 51 between the first side frame 61A and the second side frame 61B, the operation portion 73 of the lock member 70 protrudes from the first side frame 61A away from the second side frame 61B. This configuration increases the size of a space around the operation portion 73, making it easy for the user to operate the operation portion 73 to mount and remove the drawer 60 to and from the drum cartridge 51.

The cover member 522 protrudes to a position located on an outer side of the first side frame 61A in the right and left direction and covers substantially the entirety of an upper side of the operation portion 73. This configuration increases the effect of preventing the user from performing misoperation of the operation portion 73 of the lock member 70 when removing the developing cartridge 52 from the drum cartridge 51.

The first projecting portion 516A of the first drum frame 511A which is engaged with the claw 72 when the lock member 70 is located at the lock position protrudes from the first side wall 512A of the first drum frame 511A away from the second drum frame 511B. This configuration facilitates designing a mechanism of engagement between the first projecting portion 516A and the claw 72 of the lock member 70 provided on the first side frame 61A.

In the present embodiment, the lock member 70 is provided on the first side frame 61A, and the cover member 522 is provided at the right end portion of the development frame 521. However, the image forming apparatus 1 may be configured such that the lock member 70 is provided on the second side frame 61B, and the cover member 522 is provided at a left end portion of the development frame 521.

Second Embodiment

Figure 11A:
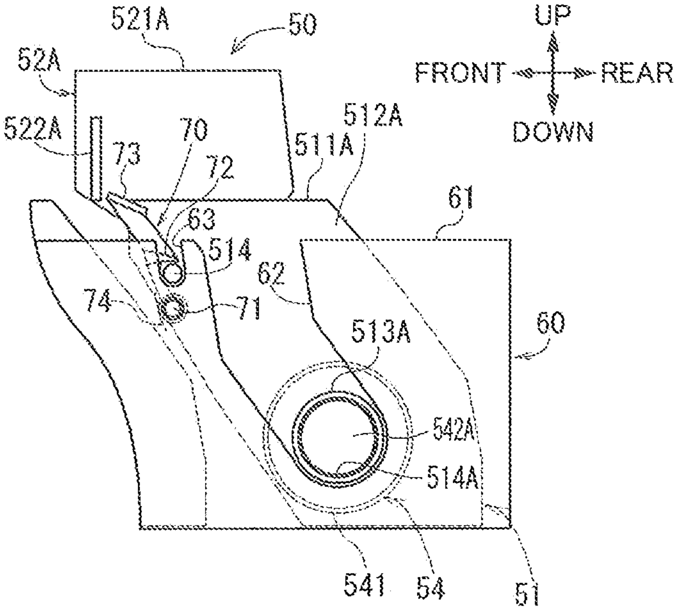
FIG. 11A is a side view of a cover member according to the second embodiment.

The cover member 522 of the developing cartridge 52 may be configured as follows. For example, a cover member 522A illustrated in FIG. 11A is provided on a development frame 521A of a developing cartridge 52A and protrudes outward from a right end portion of the development frame 521A in the right and left direction.

The cover member 522A is disposed in front of the operation portion 73 of the lock member 70 in a state in which the developing cartridge 52A is mounted to the drum cartridge 51. The cover member 522A protrudes outward from the first side frame 61A of the drawer 60 in the right and left direction and covers substantially the entirety of a front side of the operation portion 73. That is, an area occupied by the cover member 522A overlaps an area occupied by the operation portion 73 in elevational view of the cover member 522A.

Thus, also in the configuration in which the cover member 522A is disposed in front of the operation portion 73, it is difficult for the user to press the operation portion 73 down from a front and upper side of the drawer 60, making it possible to keep the lock member 70 at the lock position. In the case where the user views the drawer 60 from a front and upper side thereof, the operation portion 73 is hidden by the cover member 522A and not visible to the user, thereby preventing the user from having an intension of operating the operation portion 73.

This prevents the user from performing misoperation of the operation portion 73 of the lock member 70 and removing the drum cartridge 51 from the drawer 60 with the developing cartridge 52A when removing the developing cartridge 52A from the drum cartridge 51.

Third Embodiment

Figure 11B:
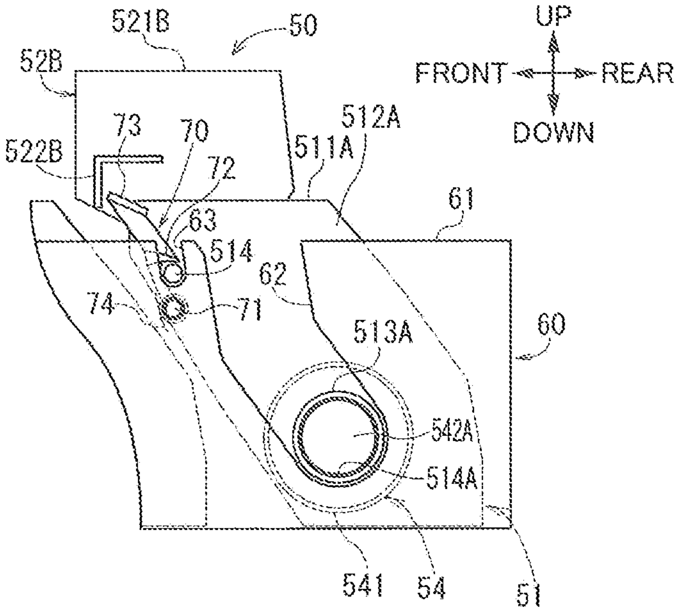
FIG. 11B is a side view of a cover member according to the third embodiment.

The cover member 522 of the developing cartridge 52 may be configured as follows. For example, a cover member 522B illustrated in FIG. 11B is provided on a development frame 521B of a developing cartridge 52B and protrudes outward from a right end portion of the development frame 521B in the right and left direction.

The cover member 522B is disposed on an upper side and a front side of the operation portion 73 of the lock member 70 in a state in which the developing cartridge 52B is mounted to the drum cartridge 51. The cover member 522B protrudes outward from the first side frame 61A of the drawer 60 in the right and left direction. The cover member 522B extends upward and then rearward continuously and covers substantially the entirety of an upper side and a front side of the operation portion 73. That is, an area occupied by the cover member 522B overlaps an area occupied by the operation portion 73 in elevational view and plan view of the cover member 522B.

Thus, also in the configuration in which the cover member 522B is disposed on an upper side and a front side of the operation portion 73, it is difficult for the user to press the operation portion 73 down from a front and upper side of the drawer 60, making it possible to keep the lock member 70 at the lock position. In the case where the user views the drawer 60 from a front and upper side thereof, the operation portion 73 is hidden by the cover member 522B and not visible to the user, thereby preventing the user from having an intension of operating the operation portion 73.

This prevents the user from performing misoperation of the operation portion 73 of the lock member 70 and removing the drum cartridge 51 from the drawer 60 with the developing cartridge 52B when removing the developing cartridge 52B from the drum cartridge 51.

What is claimed is:

1. An image forming apparatus, comprising:

a housing;

a drum cartridge comprising a photoconductive drum, a first drum frame that supports a first end of the photoconductive drum, and a second drum frame that supports a second end of the photoconductive drum;

a developing cartridge detachably mountable to the drum cartridge, the developing cartridge comprising a developing roller; and a drawer comprising a first side frame configured to support a first end of the drum cartridge and a second side frame configured to support a second end of the drum cartridge, the drawer being movable between an inner position and an outer position, the drum cartridge being detachable from the drawer in a detaching direction, wherein the first drum frame includes a first developing cartridge guide, the second drum frame includes a second developing cartridge guide, the first side frame of the drawer includes a first drum cartridge guide, and the second side frame of the drawer includes a second drum cartridge guide, and wherein, in the state in which the drum cartridge is mounted to the drawer and the developing cartridge is mounted to the drum cartridge, the first drum cartridge guide is located farther from the developing cartridge than the first developing cartridge guide and the second drum cartridge guide is located farther from the developing cartridge than the second developing cartridge guide.

2. The image forming apparatus according to claim 1, wherein, in the state in which the drum cartridge is mounted to the drawer and the developing cartridge is mounted to the drum cartridge, the first developing cartridge guide is formed on an inner surface of the first drum frame of the drum cartridge, and the second developing cartridge guide is formed on an inner surface of the second drum frame of the drum cartridge.

3. The image forming apparatus according to claim 2, wherein the developing cartridge includes a development frame that supports the developing roller rotatably, the developing roller includes a roller shaft, and each of a first end and a second end of the roller shaft protrudes from the development frame, and wherein, when the developing cartridge is mounted to the drum cartridge, the first developing cartridge guide is configured to guide the first end of the roller shaft, and, the second developing cartridge guide is configured to guide the second end of the roller shaft.

4. The image forming apparatus according to claim 3, wherein, in the state in which the drum cartridge is mounted to the drawer and the developing cartridge is mounted to the drum cartridge, the first end of the roller shaft is located nearer to the development frame than the first side frame of the drawer, and the second end of the roller shaft is located nearer to the development frame than the second side frame of the drawer.

5. The image forming apparatus according to claim 1, wherein, in the state in which the drum cartridge is mounted to the drawer, a lower end of the first developing cartridge guide is located lower than an upper end of the first drum cartridge guide in height.

6. The image forming apparatus according to claim 5, wherein the first developing cartridge guide is a groove and the first drum cartridge guide is a groove, and wherein a width of the groove of the first developing cartridge guide is smaller than a width of the groove of first drum cartridge guide.

7. The image forming apparatus according to claim 6, wherein, in the state in which the drum cartridge is mounted to the drawer, a lower end of the groove of the first developing cartridge guide is located upper than a lower end of the groove of the first drum cartridge guide in height.

8. The image forming apparatus according to claim 1, wherein the first drum frame includes a first protruding portion that supports the first end of the photoconductive drum rotatably, and the second drum frame includes a second protruding portion that supports the second end of the photoconductive drum rotatably, and wherein, when the drum cartridge is mounted to the drawer, the first drum cartridge guide is configured to guide the first protruding portion, and the second drum cartridge guide is configured to guide the second protruding portion.

9. The image forming apparatus according to claim 8, wherein, in the state in which the drum cartridge is mounted to the drawer and the developing cartridge is mounted to the drum cartridge, an end of the first protruding portion of the first drum frame is located father from the developing cartridge than the first side frame of the drawer in an axial direction of the photoconductive drum, and an end of the second protruding portion of the second drum frame is located father from the developing cartridge than the second side frame of the drawer in the axial direction of the photoconductive drum.

10. An image forming apparatus, comprising:

a housing;

a drum cartridge comprising a photoconductive drum, a first drum frame that supports a first end of the photoconductive drum, and a second drum frame that supports a second end of the photoconductive drum;

a developing cartridge detachably mountable to the drum cartridge, the developing cartridge comprising a developing roller; and a drawer comprising a first side frame configured to support a first end of the drum cartridge and a second side frame configured to support a second end of the drum cartridge, the drawer being movable between an inner position and an outer position, the drum cartridge being detachable from the drawer in a detaching direction, wherein the first drum frame includes a first developing cartridge guide, the second drum frame includes a second developing cartridge guide, the first side frame of the drawer includes a first drum cartridge guide, and the second side frame of the drawer includes a second drum cartridge guide.

11. An image forming apparatus, comprising:

a housing;

a drum cartridge comprising a photoconductive drum, a first drum frame that supports a first end of the photoconductive drum, and a second drum frame that supports a second end of the photoconductive drum;

a developing cartridge detachably mountable to the drum cartridge, the developing cartridge comprising a developing roller; and a drawer comprising a first side frame configured to support a first end of the drum cartridge and a second side frame configured to support a second end of the drum cartridge, the drawer being movable between an inner position and an outer position, the drum cartridge being detachable from the drawer in a detaching direction, wherein, the first drum frame including a first developing cartridge guide, and the second drum frame including a second developing cartridge guide, and the first side frame of the drawer including a first drum cartridge guide, and the second side frame of the drawer including a second drum cartridge guide, and wherein, in the state in which the drum cartridge is mounted to the drawer, a lower end of the first developing cartridge guide is located upper than a lower end of the first drum cartridge guide in height.

* * * * *